3,396,185
POLYMERIC ORGANO TIN MERCAPTIDES AND CARBOXYLATES AND THE PREPARATION THEREOF
Ingenuin Hechenbleikner, Kenwood, Raymond S. Dalter, Cincinnati, and John F. Hussar, Loveland, Ohio, assignors to Carlisle Chemical Works, Inc., Reading, Ohio, a corporation of Ohio
No Drawing. Filed Jan. 22, 1965, Ser. No. 427,487
31 Claims. (Cl. 260—429.7)

ABSTRACT OF THE DISCLOSURE

Compounds are prepared having a formula selected from the group consisting of (a)

$$(RSnOOC(\underset{CH}{\overset{R_5}{|}})_qOH)_n$$

(b)

$$(R\underset{|}{\overset{\downarrow}{Sn}}-S(CH_2)_qCOOR_1)_n$$

(c)

$$(R\underset{|}{\overset{\downarrow}{Sn}}-OOC(CH_2)_mCOOR_1)_n$$

(d)

$$(R\underset{|}{\overset{\downarrow}{Sn}}-OOCCH=CHCOOR_1)_n; \text{ and}$$

(e) the reaction product of 1 mole of a compound having the formula RSnOOH with 2 to 2.5 moles of a compound having a formula selected from the group consisting of $$HOOC(\underset{CH}{\overset{R_5}{|}})_qOH$$

HS(CH$_2$)$_q$COOR$_1$; HOOCR$_4$
HOOC(CH$_2$)$_m$COOR$_1$ and HOOCCH=CHCOOR$_1$ where R, and R$_1$ are hydrocarbyl; R$_4$ is selected from the group consisting of hydrogen and hydrocarbyl; R$_5$ is selected from the group consisting of hydrogen and methyl; n is an integer of at least 2; m is selected from the group consisting of zero and a positive integer; and q is an integer of at least one. The compounds are useful as stabilizers for halogen containing resins and hydrocarbon polymers.

---

This invention relates to novel polymeric stannoic acid derivatives.

It is an object of the present invention to prepare novel polymeric stannoic acid derivatives.

Another object is to stabilize halogen containing vinyl resins.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by preparing compounds having one of the formulae

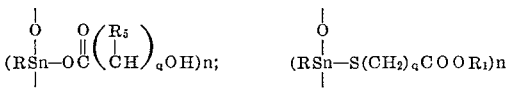

1

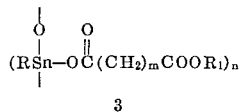

3

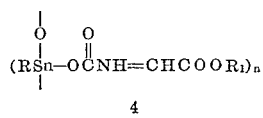

4 or a compound which may have the formula $$(R-\underset{R_3}{\overset{R_3}{|}}Sn-)_2O$$

5 where R, and R$_1$ are alkyl, aryl, aralkyl, alkenyl or alicyclic, R$_3$ is $$-SR_2, -O\overset{O}{\overset{\|}{C}}R_4, -O\overset{O}{\overset{\|}{C}}(\underset{CH}{\overset{R_5}{|}})_qOH; -S(CH_2)_qCOOR_1$$

or $$-C\overset{O}{\overset{\|}{C}}(CH_2)_mCOOR_1$$

or $$-O\overset{O}{\overset{\|}{C}}CH=CHCOOR_1$$

n is an integer of at least 2 and can be 20 or more;
m is zero or a positive integer, usually not over 10;
R$_4$ is hydrogen or hydrocarbyl, e.g. alkyl, alkenyl or phenyl;
R$_5$ is hydrogen or methyl; and
q is an integer of at least 1.

The compounds of Formulae 1, 2, 3, and 4 are prepared by the condensation reaction of a hydrocarbyl stannoic acid with an equimolar amount of a hydroxycarboxylic acid, a hydrocarbyl mercaptoalkanoate, a mercaptan or a hydrocarbyl half ester of an alkanedioic acid or of an alkenedioic acid. Water is split out as by product in the polymerization reaction and is removed, preferably by azeotropic distillation, e.g. using a hydrocarbon such as benzene, toluene, xylene, hexane, heptane, octane or petroleum ether as the azeotroping agent.

The compounds which may have Formula 5 are formed in similar fashion by reacting 1 mole of the hydrocarbyl stannoic acid with 2 moles of a monocarboxylic acid, a hydroxycarboxylic acid, a hydrocarbyl mercaptoalkanoate, a mercaptan or a hydrocarbyl half ester of an alkanedioic acid or an alkenedioic acid. Desirably a slight excess over the 2 moles of the carboxyl or mercapto group containing reactant is employed, e.g. up to 2.5 moles of such reactant per mole of stannoic acid.

As starting stannoic acids there can be used methyl stannoic acid, propyl stannoic acid, butyl stannoic acid, isobutyl stannoic acid, octyl stannoic acid, dodecyl stannoic acid, 2-ethylhexyl stannoic acid, allyl stannoic acid, vinyl stannoic acid, cyclohexyl stannoic acid, cyclopentyl stannoic acid, phenyl stannoic acid, o-tolyl stannoic acid, m-tolyl stannoic acid, p-tolyl stannoic acid, p-butylphenyl stannoic acid, benzyl stannoic acid, octadecyl stannoic acid and oleyl stannoic acid.

As hydrocarboxylic acids there can be used glycolic acid, lactic acid, β-hydroxypropionic and γ-hydroxybutyric acid.

As hydrocarbyl mercaptoalkanoates there can be employed isooctyl mercaptoacetate, octyl mercaptoacetate, isooctyl β-mercaptopropionate, methyl mercaptoacetate, ethyl mercaptoacetate, butyl mercaptoacetate, hexyl mercaptoacetate decyl mercaptoacetate, dodecyl mercaptoacetate, octadecyl mercaptoacetate, oleyl mercaptoacetate, allyl mercaptoacetate, benzyl mercaptoacetate, cyclohexyl mercaptoacetate, phenyl mercaptoacetate, p-tolyl mercaptoacetate, o-tolyl mercaptoacetate, m-tolyl mercaptoacetate, p-butylphenyl mercaptoacetate, cyclopentyl mercaptoacetate, 2-ethylhexyl mercaptoacetate, butyl β-mercaptopropionate, phenyl β-mercaptopropionate, allyl β-mercaptopropionate, dodecyl β-mercaptopropionate, cyclophenyl β-mercaptopropionate, benzyl β-mercaptopropionate and octyl γ-mercaptobutyrate.

As hydrocarbyl half esters of alkane or alkene dioic acids there can be used monooctyl oxalate, monobutyl malonate, monomethyl succinate, monobutyl maleate, monoethyl fumarate, monobutyl glutarate, monopropyl adipate, monoisooctyl succinate, monomethyl sebacate, monophenyl succinate, monobenzyl malonate, monocylcohexyl adipate, monooctadecyl azelate, monoallyl succinate, monooleyl glutarate.

As monocarboxylic acids there can be used acetic acid, propionic acid, butyric acid, valeric acid, decanoic acid, palmitic acid, stearic acid, oleic acid, acrylic acid, benzoic acid, o-toluic acid, p-toluic acid, m-toluic acid and cyclohexane carboxylic acid.

Illustrative of compounds of the present invention within Formula 1 made by the use of equimolar amounts of the stannoic acid and hydroxy carboxylic acids are the condensation product of butyl stannoic acid with either glycolic acid or lactic acid or β-hydroxypropionic acid or γ-hydroxybutyric acid. The condensation product of octyl stannoic acid with glycolic acid or lactic acid or β-hydroxypropionic acid, the condensation product of dodecyl stannoic acid with glycolic acid, the condensation product of methyl stannoic acid with lactic acid, the condensation product of phenyl stannoic acid with glycolic acid, the condensation product of allyl stannoic acic with β-hydroxypropionic acid, the condensation product of benzyl stannoic acid with glycolic acid, the condensation product of cyclohexyl stannoic acid with lactic acid.

Illustrative of compounds of the present invention within Formula 2 made by the use of equimolar amounts of the stannoic acid and hydrocarbyl mercaptoalkanoiates are the condensation products of butyl stannoic acid with isooctyl mercaptoacetate or octyl mercaptoacetate or isooctyl β-mercaptopropionate, or methyl mercaptoacetate, or ethyl mercaptoacetate, or butyl mercaptoacetate, or hexyl mercaptoacetate, or decyl mercaptoacetate, or dodecyl mercaptoacetate, or octadecyl mercaptoacetate, or oleyl mercaptoacetate, or allyl mercaptoacetate, or benzyl mercaptoacetate, or cyclohexyl mercaptoacetate, or phenyl mercaptoacetate, or p-tolyl mercaptoacetate, or o-tolyl mercaptoacetate, or m-tolyl mercaptoacetate, or p-butylphenyl mercaptoacetate, or 2-ethylhexyl mercaptoacetate, or butyl β-mercaptoacetate, or phenyl β-mercaptopropionate, or allyl β-mercaptopropionate, dodecyl β-mercaptopropionate, or benzyl β-mercaptopropionate, or octyl γ-mercaptobutyrate; the condensation products of methyl stannoic acid with isooctyl mercaptoacetate, or octyl β-mercaptopropionate; the condensation products of octyl stannoic acid with isooctyl mercaptoacetate, or isooctyl β-mercaptopropionate, or methyl mercaptoacetate, or isodecyl mercaptoacetate, or benzyl mercapto β-propionate, or phenyl mercaptoacetate, or cyclohexyl β-mercaptopropionate, or oleyl mercaptoacetate; the condensation products of isobutyl stannoic acid with propyl mercaptoacetate, or amyl β-mercaptopropionate, the condensation products of 2-ethylhexyl stannoic acid with heptyl mercaptoacetate or p-tolyl β-mercaptopropionate; the condensation product of allyl stannoic acid with isooctyl mercaptoacetate; the condensation product of oleyl stannoic acid with propyl β-mercaptopropionate; the condensation products of cyclohexyl stannoic acid with nonyl mercaptoacetate or isooctyl β-mercaptopropionate; the condensation products of phenyl stannoic acid with butyl mercaptoacetate, or decyl β-mercaptopropionate, or phenyl mercaptoacetate; the condensation product of benzyl stannoic acid with hexyl mercaptoacetate; the condensation produce of octadecyl stannoic acid with ethyl mercaptoacetate.

Illustrative of compounds of the present invention within Formulae 3 and 4 made by the use of equimolar amounts of the stannoic acid and half esters of discarboxylic acids are the condensation products of butyl stannoic acid with mono octyl oxalate, or mono butyl malonate, or mono methyl succinate, or mono butyl maleate, or mono ethyl fumarate, or mono butyl glutarate, or mono propyl adipate, or mono isooctyl succinate, or mono methyl sebacate, or mono phenyl succinate, or mono benzyl malonate, or mono cyclohexyl adpiate, or mono octadecyl azelate, or mono allyl succinate, or mono oleyl glutarate; the condensation products of methyl stannoic acid with mono octyl oxalate, or monobutyl malonate, or monomethyl succinate, or monoethyl maleate, or monoisooctyl adipate; the condensation products of octyl stannoic acid with monoamyl oxalate, or monohexyl malonate, or monobutyl succinate, or monooctyl maleate, or monoisobutyl fumarate, or monophenyl adipate, or monocyclohexyl sebacate; the condensation products of isobutyl stannoic acid with monoheptyl succinate or monobenzyl pimelate; the condensation products of 2-ethylhexyl stannoic acid with monobutyl malonate, or mono-p-tolyl succinate; the condensation product of oleyl stannoic acid with monohexyl adipate; the condensation products of cyclohexyl stannoic acid with monoamyl adipate, or monomethyl succinate, or monophenyl glutarate; the condensation products of phenyl stannoic acid with monophenyl malonate, or monoethyl fumarate, or monobutyl maleate, or monooctyl succinate; the condensation product of benzyl stannoic acid with monobutyl succinate; the condensation product of octadecyl stannoic acid with monooctyl malonate.

Illustrative of compounds of the present invention which may have Formula 5 and are made by reacting 1 mole of the stannoic acid with 2 moles of a monocarboxylic acid, a hydroxycarboxylic acid, a hydrocarbyl mercaptoalkanoate, or a hydrocarbyl half ester of an alkane or alkene dioic acid are the reaction product of 1 mole of butyl stannoic acid with 2 moles of α-hydroxy propionic acid; the reaction product of 1 mole of butyl stannoic acid with 2 moles of β-hydroxypropionic acid; the reaction product of 1 mole of butyl stannoic acid with 2 moles of gamma-hydroxybutyric acid; the reaction product of 1 mole of octyl stannoic acid with 2 moles of hydroxyacetic acid; the reaction product of 1 mole of octyl stannoic acid with 2 moles of α-hydroxypropionic acid; the reaction product of 1 mole of butyl stannoic acid with 2 moles of gamma-hydroxybutyric acid; the the reaction product of 1 mole of dodecyl stannoic acid with 2 moles of hydroxyacetic acid; the reaction product of 1 mole of methyl stannoic acid with 2 moles of α-hydroxypropionic acid; the reaction product of 1 mole of phenyl stannoic acid with 2 moles of hydroxyacetic acid; the reaction product of allyl stannoic acid with 2 moles of β-hydroxypropionic acid; the reaction product of 1 mole of benzyl stannoic acid with 2 moles of hydroxyacetic acid; the reaction product of 1 mole of cyclohexyl stannoic acid with 2 moles of α-hydroxypropionic acid; the reaction product of 1 mole of octyl stannoic acid with 2 moles of isooctyl mercaptoacetate; the reaction product of 1 mole of butyl stannoic acid with 2 moles of isooctyl β-mercapto propionate; the reaction product of 1 mole of butyl stannoic acid with 2 moles of methyl mercaptoacetic; the reaction product of 1 mole of butyl stannoic acid with 2 moles of ethyl mercaptoacetate; the reaction product of 1 mole of butyl stannoic acid with 2 moles of butyl mercaptoacetate; the reaction product of 1 mole of butyl stannoic acid with 2 moles of hexyl mercaptoacetate; the reaction product of 1 mole of butyl stannoic acid with 2 moles of decyl mercaptoacetate; the reaction product of 1 mole of butyl stannoic acid with 2 moles of dodecyl mercaptoacetate; the reaction product of 1 mole of butyl stannoic acid with 2 moles of octadecyl mercaptoacetate; the reaction product of 1 mole of butyl stannoic acid with 2 moles of oleyl mercaptoacetate; the reaction product of 1 mole of butyl stannoic acid with 2 moles of allyl mercaptoacetate; the reaction product of 1 mole of butyl stannoic acid with 2 moles of benzyl mercaptoacetate; the reaction product of 1 mole of butyl stannoic acid with 2 moles of cyclohexyl mercaptoacetate; the reaction product of 1 mole of butyl stannoic acid with 2 moles of phenyl mercaptoacetate; the reaction product of 1 mole of butyl stannoic acid with 2 moles of p-tolyl mercaptoacetate; the reaction product of 1 mole of butyl stannoic acid with 2 moles of o-tolyl merctaptoacetate; the reaction product of 1 mole of butyl stannoic acid with 2 moles of m-tolyl mercaptoacetate; the reaction product of 1 mole of butyl stannoic acid with 2 moles of p-butylphenyl mercaptoacetate; the reaction product of 1 mole of butyl stannoic acid with 2 moles of 2-ethylhexyl mercaptoacetate; the reaction product of 1 mole of butyl stannoic acid with 2 moles of butyl β-mercaptopropionate; the reaction product of 1 mole of butyl stannoic acid with 2 moles of phenyl β-mercaptopropionate; the reaction product of 1 mole of butyl stannoic acid with 2 moles of allyl β-mercaptopropionate; the reaction product of 1 mole of butyl stannoic acid with 2 moles of dodecyl β-mercaptopropionate; the reaction product of 1 mole of butyl stannoic acid with 2 moles of benzyl β-mercaptopropionate; the reaction product of 1 mole of butyl stannoic acid with 2 moles of octyl gamma mercaptobutyrate; the reaction product of 1 mole of methyl stannoic acid with 2 moles of isooctyl mercaptoacetate; the reaction product of 1 mole of methyl stannoic acid with 2 moles of octyl β-mercaptopropionate; the reaction product of 1 mole of octyl stannoic acid with 2 moles of isooctyl mercaptoacetate; the reaction product of 1 mole of octyl stannoic acid with 2 moles of isooctyl β-mercaptopropionate; the reaction product of 1 mole of octyl stannoic acid with 2 moles of methyl mercaptoacetate; the reaction product of 1 mole of octyl stannoic acid with 2 moles of isodecyl mercaptoacetate; the reaction product of 1 mole of octyl stannoic acid with 2 moles of benzyl β-mercaptopropionate; the reaction product of 1 mole of octyl stannoic acid with 2 moles of phenyl mercaptoacetate; the reaction product of 1 mole of octyl stannoic acid with 2 moles of cyclohexyl β-mercaptopropionate; the reaction product of 1 mole of octyl stannoic acid with 2 moles of oleyl mercaptoacetate; the reaction product of 1 mole of isobutyl stannoic acid with 2 moles of propyl mercaptoacetate; the reaction product of 1 mole of isobutyl stannoic acid with 2 moles of amyl β-mercaptopropionate; the reaction product of 1 mole of 2-ethylhexyl stannoic acid with 2 moles of heptyl mercaptoacetate; the reaction product of 1 mole of 2-ethylhexyl stannoic acid with 2 moles of p-tolyl β-mercaptopropionate; the reaction product of 1 mole of allyl stannoic acid with 2 moles of isooctyl mercaptoacetate; the reaction product of 1 mole of oleyl stannoic acid with 2 moles of propyl β-mercaptopropionate; the reaction product of 1 mole of cyclohexyl stannoic acid with 2 moles of nonyl mercaptoacetate; the reaction product of 1 mole of cyclohexyl stannoic acid with 2 moles of isooctyl β-mercaptopropionate; the reaction product of 1 mole of phenyl stannoic acid with 2 moles of butyl mercaptoacetate; the reaction product of 1 mole of phenyl stannoic acid with 2 moles of decyl β-mercaptoacetate; the reaction product of 1 mole of phenyl stannoic acid with 2 moles of phenyl mercaptoacetate; the reaction product of 1 mole of benzyl stannoic acid with 2 moles of hexyl mercaptoacetate; the reaction product of 1 mole of octadecyl stannoic acid with 2 moles of ethyl mercaptoacetate; the reaction product of 1 mole of butyl stannoic acid with 2 moles of monooctyl oxalate; the reaction product of 1 mole of butyl stannoic acid with 2 moles of monobutyl malonate; the reaction product of 1 mole of butyl stannoic acid with 2 moles of monomethyl succinate; the reaction product of 1 mole of butyl stannoic acid with 2 moles of monobutyl maleate; the reaction product of 1 mole of butyl stannoic acid with 2 moles of monoethyl fumarate; the reaction product of 1 mole of butyl stannoic acid with 2 moles of monobutyl glutarate; the reaction product of 1 mole of butyl stannoic acid with 2 moles of monopropyl adipate; the reaction product of 1 mole of butyl stannoic acid with 2 moles of monoisooctyl succinate; the reaction product of 1 mole of butyl stannoic acid with 2 moles of monomethyl sebacate; the reaction product of 1 mole of butyl stannoic acid with 2 moles of monophenyl succinate; the reaction product of 1 mole of butyl stannoic acid with 2 moles of monobenzyl malonate; the reaction product of 1 mole of butyl stannoic acid with 2 moles of monocyclohexyl adipate; the reaction product of 1 mole of butyl stannoic acid with 2 moles of monooctadecyl azelate; the reaction product of 1 mole of butyl stannoic acid with 2 moles of monoallyl succinate; the reaction product of 1 mole of butyl stannoic acid with 2 moles of monooleyl glutarate; the reaction product of 1 mole of methyl stannoic acid with 2 moles of monooctyl oxalate; the reaction product of 1 mole of methyl stannoic acid with 2 moles of monobutyl malonate; the reaction product of 1 mole of methyl stannoic acid with 2 moles of monomethyl succinate; the reaction product of 1 mole of methyl stannoic acid with 2 moles of monoethyl maleate; the reaction product of 1 mole of methyl stannoic caid with 2 moles of monoisooctyl adipate; the reaction product of 1 mole of octyl stannoic acid with 2 moles of monoamyl oxalate; the reaction product of 1 mole of octyl stannoic acid with 2 moles of monohexyl malonate; the reaction product of 1 mole of octyl stannoic acid with 2 moles of monobutyl succinate; the reaction product of 1 mole of octyl stannoic acid with 2 moles of monooctyl maleate; the reaction product of 1 mole of octyl stannoic acid with 2 moles of monoisobutyl fumarate; the reaction product of 1 mole of octyl stannoic acid with 2 moles of monophenyl adipate; the reaction product of 1 mole of octyl stannoic acid with 2 moles of monocyclohexyl sebacate; the reaction product of 1 mole of isobutyl stannoic acid with 2 moles of monoheptyl succinate; the reaction product of 1 mole of isobutyl stannoic acid with 2 moles of monobenzyl pimelate; the reaction product of 1 mole of 2-ethylhexyl stannoic acid with 2 moles of monobutyl malonate; the reaction product of 1 mole of 2-ethylhexyl stannoic acid with 2 moles of mono-p-tolyl succinate; the reaction product of 1 mole of oleyl stannoic acid with 2 moles of monohexyl adipate; the reaction product of 1 mole of cyclohexyl stannoic acid with 2 moles of monoamyl adipate; reaction product of 1 mole of cyclohexyl stannoic acid with 2 moles of monomethyl succinate; the reaction product of 1 mole of cyclohexyl stannoic acid with 2 moles of monophenyl glutarate; the reaction product of 1 mole of phenyl stannoic acid with 2 moles of monophenyl malonate; the reaction product of 1 mole of phenyl stannoic acid with 2 moles of monoethyl fumarate; the reaction product of 1 mole of phenyl stannoic acid with 2 moles of monobutyl maleate; the reaction product of 1 mole of phenyl stannoic acid with 2 moles of monooctyl succinate; the reaction product of 1 mole of benzyl stannoic acid with 2 moles of monobutyl succinate; the reaction product of 1 mole of octadecyl stannoic acid with 2 moles of monooctyl malonate; the reaction product of 1 mole of butyl stannoic acid with 2 moles of acetic acid; the reaction product of 1 mole of butyl stannoic acid with 2 moles of propionic acid; the reaction product of 1 mole of butyl stannoic acid with 2 moles of formic acid; the reaction product of 1 mole of butyl stannoic acid with 2 moles of butyric acid; the reaction product of 1 mole of butyl stanonic acid with 2 moles of valeric acid; the reaction product of 1 mole of butyl stannoic acid with 2 moles of decanoic acid; the reaction product of 1 mole of butyl stannoic acid with 2 moles of palmitic acid; the reaction product of 1 mole of butyl stannoic acid with 2 moles of stearic acid; the reaction product of 1 mole of butyl stannoic acid with 2 moles of oleic acid; the reaction product of 1 mole of butyl stannoic acid with 2 moles of acrylic acid; the reaction product of 1 mole of butyl stannoic acid with 2 moles of benzoic acid; the reaction product of 1 mole of butyl stannoic acid with 2 moles of o-toluic acid; the reaction product of 1 mole of butyl stanonic acid with 2 moles of p-toluic acid; the reaction product of 1 mole of butyl stannoic acid with 2 moles of m-toluic acid; the reaction product of 1 mole of butyl stannoic acid with 2 moles of cyclohexanoic acid; the reaction product of 1 mole of methyl stannoic acid with 2 moles of acetic acid; the reaction product of 1 mole of methyl stannoic acid with 2 moles of valeric acid; the reaction product of 1 mole of methyl stannoic acid with 2 moles of benzoic acid; the reaction product of 1 mole of octyl stannoic acid with 2 moles of acetic acid; the reaction product of 1 mole of octyl stannoic acid with 2 moles of propionic acid; the reaction product of 1 mole of octyl stannoic acid with 2 moles of stearic acid; the reaction product of 1 mole of octyl stannoic acid with 2 moles of benzoic acid; the reaction product of 1 mole of phenyl stannoic acid with 2 moles of benzoic acid; the reaction product of 1 mole of phenyl stannoic acid with 2 moles of acetic acid; and the reaction product of 1 mole of phenyl stannoic acid with 2 moles of butyric acid.

In addition to the compounds set forth above there can also be employed as stabilizers for halogen containing resins compounds prepared by reacting a hydrocarbyl stannoic acid with an equimolar amount of a hydrocarbyl mono carboxylic acid and a removal of water as previously set forth. Thus there can be used such condensation products of butyl stannoic acid with either acetic acid, or propionic acid, or butyric acid, or valeric acid, or decanoic acid, or palmitic acid, or stearic acid, or oleic acid, or formic acid, or acrylic acid, or benzoic acid, or o-toluic acid, or p-toluic acid, or m-toluic acid, or cyclohexane carboxylic acid; the condensation products of methyl stannoic acid with either acetic acid or valeric acid or benzoic acid; the condensation products of octyl stannoic acid with either acetic acid, or propionic acid, or butyric acid, or stearic acid, or formic acid, or benzoic acid; the condensation products of phenyl stannoic acid with either acetic acid, or propionic acid, or palmitic acid or benzoic acid.

Unless otherwise indicated all parts and percentages are by weight.

The stabilizers of the present invention can be used with halogen containing vinyl and vinylidene resins in which the halogen is attached directly to the carbon atoms. Preferably, the resin is a vinyl halide resin, specifically, a vinyl chloride resin. Usually, the vinyl chloride resin is made from monomers consisting of vinyl chloride alone or a mixture of monomers comprising at least 70% vinyl chloride by weight. When vinyl chloride copolymers are stabilized, preferably the copolymer of vinyl chloride with an ethylenically unsaturated compound copolymerizable therewith contains at least 10% of polymerized vinyl chloride.

As the chlorinated resin there can be employed chlorinated polyethylene having 14 to 75°, e.g. 27%, chlorine by weight, polyvinyl chloride, polyvinylidene chloride, polyvinyl bromide, polyvinyl fluoride, copolymers of vinyl chloride with 1 to 90%, preferably 1 to 30%, of a copolymerizable ethylenically unsaturated material such as vinyl acetate, vinyl butyrate, vinyl benzoate, vinylidene chloride, diethyl fumarate, diethyl maleate, other alkyl fumarates and maleates, vinyl propionate, methyl acrylate, 2-ethylhexyl acrylate, butyl acrylate and other alkyl acrylates, methyl methacrylate, ethyl methacrylate, butyl methacrylate and other alkyl methacrylates, methyl alpha chloroacrylate, styrene, trichloroethylene, vinyl ethers such as vinyl ethyl ether, vinyl chloroethyl ether and vinyl phenyl ether, vinyl ketones such as vinyl methyl ketone and vinyl phenyl ketone, 1-fluoro-1-chloroethylene, acrylonitrile, chloroacrylonitrile, allylidene diacetate and chloroallylidene diacetate. Typical copolymers include vinyl chloride-vinyl acetate (96:4 sold commercially as VYNW), vinyl chloride-vinylacetate (87:13), vinyl chloride-vinyl acetate-maleic anhydride (86:13:1), vinyl chloride-vinylidene chloride (95:5), vinyl chloride-diethyl fumarate (95:5), vinyl chloride-trichloroethylene (95:5), vinyl chloride-2-ethylhexyl acrylate (80:20).

The stabilizers of the present invention can be incorporated with the resin by admixing in an appropriate mill or mixer or by any of the other well-known methods which provide for uniform distribution throughout the resin compositions. Thus, mixing can be accomplished by milling on rolls at 100–160° C.

In addition to the novel stabilizers there can also be incorporated with the resin conventional additives such as plasticizers, pigments, fillers, dyes, ultraviolet light absorbing agents, densifying agents and the like.

If a plasticizer is employed, it is used in conventional amount, e.g. 30 to 150 parts per 100 parts of resin. Typical plasticizers are di-2-ethylhexyl phthalate, dibutyl sebacate, dioctyl sebacate, tricresyl phosphate.

The tin containing stabilizers are normally used in an amount of 0.01 to 10% by weight of the resin, more preferably 0.2 to 5% of the tin compound is used by weight of the resin.

The tin containing stabilizers can also be used in amounts of 0.01 to 10% to stabilize hydrocarbon polymers such as polyethylene, polypropylene, ethylene propylene copolymer (e.g. 6:40); ethylene-butene-1 copolymer (e.g. 95.5) and the like.

EXAMPLE 1

1 mole (227 grams) of butyl stannoic acid was dehydrated in 800 grams of benzene by azeotropic distillation. Most of the benzene was distilled off at reduced pressure. There was then added slowly with agitation 452 grams (2.34 moles) of isooctyl mercaptoacetate to the dehydrated butyl stannoic acid at 95° C. The removal of benzene and the water of reaction was continued for three hours at reduced pressure after all the isooctyl mercaptoacetate was added while holding the temperature under 95° C. The product in the reaction flask after filtration was a water-white clear liquid.

EXAMPLE 2

Two moles (565.1 grams) of butyltin trichloride was reacted with 12 moles (480 grams) of 50% sodium hydroxide in 2000 grams of water by addition of the alkali to the solution of butyltin trichloride and water at 50° C., and, after filtration, water washing the product to remove sodium chloride, a wet yield of 695 grams (445 grams dry) of butyl stannoic acid was obtained.

There was reacted 695 grams (1.96 moles on a dry basis) of the wet butyl stannoic acid and 428 grams (1.96 moles) of isooctyl β-mercaptopropionate under reduced pressure at 70–125° C. for five hours with agitation. Upon filtration there was obtained the polymeric tin ester as a clear, water-white liquid.

9

EXAMPLE 3

The procedure of Example 1 was repeated using 2.34 moles of isooctyl β-mercaptopropionate in place of the issoctyl mercaptoacetate to produce the reaction product as a liquid.

EXAMPLE 4

The procedure of Example 2 was repeated replacing the isooctyl mercaptopropionate by 1.96 moles of acetic acid to produce the polymeric condensation product of butyl stannoic acid with acetic acid as an infusible solid.

EXAMPLE 5

The procedure of Example 2 was repeated replacing the isooctyl mercaptopropionate by 1.96 moles of glycolic acid to produce the polymeric condensation product of butyl stannoic acid with glycolic acid as an infusible solid.

EXAMPLE 6

The procedure of Example 2 was repeated replacing the butyl stannoic acid by 1.96 moles of octyl stannoic acid and replacing the isooctyl mercaptopropionate by 1.96 moles of mono butyl maleate to produce the polymeric condensation product of octyl stannoic acid with mono butyl maleate as a liquid.

EXAMPLE 7

The procedure of Example 2 was repeated using as the reactants 1.96 moles of phenyl stannoic acid and 1.96 moles of isooctyl mercaptoacetate to produce the polymeric condensation product of phenyl stannoic acid with isooctyl mercaptoacetate as a liquid.

EXAMPLE 8

The procedure of Example 1 was repeated using 2.34 moles of glycolic acid in place of the isooctyl mercaptoacetate to produce the corresponding reaction product.

EXAMPLE 9

The procedure of Example 1 was repeaated using 2.34 moles of monobutyl malonate in place of the isooctyl mercaptoacetate to produce the corresponding reaction product.

The other tin esters set forth previously in this specification can be made in the manner described in Examples 1 and 2 by employing the correct stannoic acid with the appropriate hydrocarboxylic acid, hydrocarbyl mercaptoalkanoate, hydrocarbyl half ester of an alkane or alkene dioic acid, or hydrocarbyl carboxylic acid and employing the proportions of Example 1 for the corresponding products or the proportions of Example 2 for the polymeric compounds.

EXAMPLE 10

A stabilized composition was prepared by mixing 2 parts of the product prepared in Example 1 with 100 parts of polyvinyl chloride (Geon 101EP).

EXAMPLE 11

A similarly stabilized resin was obtained by mixing 3 parts of the product prepared in Example 3 with 100 parts of polyvinyl chloride (Geon 101EP) and 50 parts of dioctyl phthalate.

EXAMPLE 12

A stabilized polyvinyl chloride composition was obtained by replacing the tin stabilizer employed in Example 10 with 2 parts of the polymeric tin ester prepared in Example 2.

EXAMPLE 13

Stabilized polyvinyl chloride compositions were also obtained by replacing the tin stabilizer employed in Example 10 with (a) 2 parts of the tin ester prepared in Example 3; or (b) 2.5 parts of the polymeric tin ester prepared in Example 4; or (c) 2 parts of the polymeric tin ester prepared in Example 5; or (d) 2 parts of the polymeric tin ester prepared in Example 6; or (e) 3 parts of the polymeric tin ester prepared in Example 7; or (f) 2.5 parts of the tin ester prepared in Example 8; or (g) 2 parts of the tin ester prepared in Example 9.

What is claimed is:

1. A compound having a formula selected from the group consisting of:

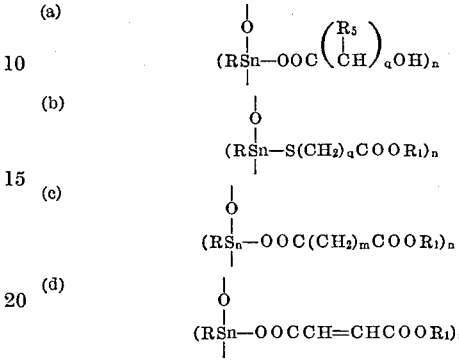

and (e) The reaction product of 1 mole of a compound having the formula RSnOOH with 2 to 2.5 moles of a compound having a formula selected from the group consisting of

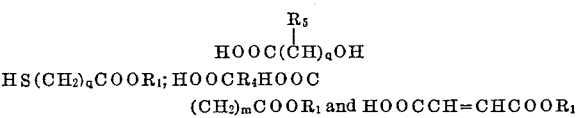

where R, and $R_1$ are hydrocarbyl; $R_4$ is selected from the group consisting of hydrogen and hydrocarbyl;

$R_5$ is selected from the group consisting of hydrogen and methyl;

$n$ is an integer of at least 2;

$m$ is selected from the group consisting of zero and a positive integer; and $q$ is an integer of at least one.

2. A polymeric condensation product of equimolar amounts of an alkyl stannoic acid and a hydroxyalkanoic acid having 2 to 10 carbon atoms.

3. A polymeric condensation product of equimolar amounts of an alkyl stannoic acid and glycolic acid.

4. Polymeric condensation product of equimolar amounts of butyl stannoic acid and glycolic acid.

5. Polymeric condensation products of equimolar amounts of a hydrocarbyl stannoic acid and a hydrocarbyl mercaptoalkanoate.

6. Polymeric condensation products of equimolar amounts of alkyl stannoic acid and an alkylmercaptoalkanoate having 2 to 3 carbon atoms in the alkanoate group.

7. Polymeric condensation product of equimolar amounts of butyl stannoic acid and an octyl mercaptoalkanoate having 2 to 3 carbon atoms in the alkanoate group.

8. Polymeric condensation product of equimolar amounts of phenyl stannoic acid and an alkyl mercaptoalkanoate having 2 to 3 carbon atoms in the alkanoate group.

9. Polymeric condensation product of equimolar amounts of a hydrocarbyl stannoic acid and a hydrocarbyl mercaptan.

10. Polymeric condensation product of equimolar amounts of a hydrocarbyl stannoic acid and a mono hydrocarbyl ester of a hydrocarbon dioic acid.

11. Polymeric condensation product of equimolar amounts of an alkyl stannoic acid and a mono alkyl ester of an alkenedioic acid having 4 carbon atoms.

12. Polymeric condensation product of equimolar amounts of butyl stannoic acid and an alkyl mercaptoalkanoate having 2 to 3 carbon atoms in the alkanoate group.

13. Polymeric condensation product of equimolar amounts of an alkyl stannoic acid and a monoalkyl ester of an alkanedioic acid having 2 to 10 carbon atoms.

14. The reaction product of 1 mole of hydrocarbyl stannoic acid with 2 to 2.5 moles of hydrocarbyl carboxylic acid.

15. The reaction product of 1 mole of alkyl stannoic acid with 2 to 2.5 moles of alkanoic acid having 2 to 18 carbon atoms.

16. The reaction product of 1 mole of alkyl stannoic acid with 2 to 2.5 moles of alkenoic acid having 3 to 18 carbon atoms.

17. The reaction product of 1 mole of alkyl stannoic acid with 2 to 2.5 moles of benzoic acid.

18. The reaction product of 1 mole of alkyl stannoic acid with 2 to 2.5 moles of hydroxy-alkanoic acid having 2 to 10 carbon atoms.

19. The reaction product of 1 mole of butyl stannoic acid with 2 to 2.5 moles of glycolic acid.

20. The polymeric reaction product of 1 mole of hydrocarbyl stannoic acid with 2 to 2.5 moles of hydrocarbyl mercaptoalkanoate.

21. The polymeric reaction product of 1 mole of alkyl stannoic acid with 2 to 2.5 moles of alkyl mercaptoalkanoate having 2 to 3 carbon atoms in the alkanoate.

22. The polymeric reaction product of 1 mole of butyl stannoic acid with 2 to 2.5 moles of alkyl mercaptoalkanoate having 2 to 3 carbon atoms in the alkanoate.

23. The polymeric reaction product of 1 mole of butyl stannoic acid with 2 to 2.5 moles of octyl mercaptoalkanoate having 2 to 3 carbon atoms in the alkanoate group.

24. The polymeric reaction product of 1 mole of phenyl stannoic acid with 2 to 2.5 moles of alkyl mercaptoalkanoate having 2 to 3 carbon atoms in the alkanoate group.

25. The reaction product of 1 mole of hydrocarbyl stannoic acid with 2 to 2.5 moles of mono hydrocarbyl ester of a hydrocarbon dioic acid.

26. The reaction product of 1 mole of alkyl stannoic acid with 2 to 2.5 moles of mono alkyl alkenedioic acid having 4 carbon atoms in the alkenedioic acid group.

27. The reaction product of 1 mole of alkyl stannoic acid with 2 to 2.5 moles of mono alkyl alkane dioic acid having 2 to 10 carbon atoms in the alkane dioic acid group.

28. The polymeric condensation product of 1 mole of hydrocarbyl stannoic acid with from 1 to 2.5 moles of a compound having a formula selected from the group consisting of

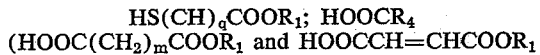

wherein $R_5$ is hydrogen or methyl, $R_1$ is hydrocarbyl, $R_4$ is hydrogen or hydrocarbyl, $m$ is 0 or a positive integer and $q$ is an integer of at least 1.

29. The reaction product according to claim 19 wherein glycolic acid are employed.

30. The reaction product according to claim 20 wherein 2 moles of hydrocarbyl mercapto alkanoate are employed.

31. The condensation product according to claim 28 wherein 1 mole of the hydrocarbyl stannoic acid is reacted with 2 moles of the other compound.

References Cited
UNITED STATES PATENTS

| | | | |
|---|---|---|---|
| 2,641,596 | 6/1953 | Leistner et al. | 260—429.7 XR |
| 2,789,102 | 4/1957 | Weinberg | 260—45.75 |

TOBIAS E. LEVOW, *Primary Examiner.*

W. F. W. BELLAMY, *Assistant Examiner.*